United States Patent
Foley et al.

(10) Patent No.: US 10,365,845 B1
(45) Date of Patent: Jul. 30, 2019

(54) MAPPED RAID RESTRIPE FOR IMPROVED DRIVE UTILIZATION

(71) Applicant: EMC IP Holding Company LLC, Hopkinton, MA (US)

(72) Inventors: Robert P. Foley, Clinton, MA (US); Peter Puhov, Shrewsbury, MA (US); Ashok Tamilarasan, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 190 days.

(21) Appl. No.: 15/661,679

(22) Filed: Jul. 27, 2017

(51) Int. Cl.
*G06F 3/06* (2006.01)

(52) U.S. Cl.
CPC ............ *G06F 3/064* (2013.01); *G06F 3/0619* (2013.01); *G06F 3/0689* (2013.01); *G06F 3/0617* (2013.01)

(58) Field of Classification Search
CPC ...... G06F 3/065; G06F 3/0689; G06F 3/0617; G06F 3/0619
USPC ........................................................ 711/114
See application file for complete search history.

(56) References Cited

U.S. PATENT DOCUMENTS

| | | | |
|---|---|---|---|
| 7,937,421 B2 | 5/2011 | Mikesell et al. | |
| 7,984,324 B2 | 7/2011 | Daud et al. | |
| 8,051,425 B2 | 11/2011 | Godman et al. | |
| 8,214,334 B2 | 7/2012 | Mikesell et al. | |
| 2008/0151724 A1* | 6/2008 | Anderson | G06F 11/1471 369/53.42 |

* cited by examiner

*Primary Examiner* — Shane D Woolwine
(74) *Attorney, Agent, or Firm* — BainwoodHuang

(57) ABSTRACT

Techniques for managing restriping of data across drives of a data storage system in a mapped-RAID environment. In response to addition of a drive to existing drives of the data storage system, all drive extents of the data storage system are mapped out in an effort to consume as much free space as possible across the drives. Having mapped out the drive extents, how many free extents remain on each drive is determined. If a quantity of free extents on a drive exceeds a predetermined threshold number, then that drive is logically marked as requiring restriping. Restriping of data is then performed for all logically marked drives. Once the restriping of the data is completed, a determination is made as to whether any further restriping of data across the drives of the data storage system is required, taking into account a relative wear and/or utilization of the respective physical drives.

20 Claims, 6 Drawing Sheets

MAPPED RAID RESTRIPE FOR IMPROVED DRIVE UTILIZATION

BACKGROUND

Conventional data storage systems are commonly configured to provide mapped logical units of storage (also referred to herein as "LUN(s)") for block-level access. The mapped LUNs typically include storage from physical drives configured as one or more redundant array of independent disk (RAID) groups. For example, in drive array systems classified as RAID level 5, block-level data stripes, each including multiple data blocks and a parity block, extend across all physical drives of a RAID level 5 group such that one data or parity block is placed on each physical drive.

SUMMARY

In such conventional data storage systems, in order to provide additional storage capacity, multiple physical drives (e.g., four drives, six drives) are typically added at a time to the data storage systems to create RAID groups appropriate for the RAID classifications (e.g., RAID level 5, RAID level 6). As a result, even if, for example, a single additional drive would satisfy a user's data storage needs in a particular situation, the user would have to bear the cost and complexity of adding four, six, or any other suitable number of physical drives to his or her data storage system based on the RAID classification.

Unlike conventional data storage systems, data storage systems in mapped-RAID environments do not require block-level data stripes to extend across all drives of a RAID group, or require new drives to be added to the data storage systems in multiples of four or six, for example, as in conventional data storage systems. However, in instances where a single additional drive would satisfy a user's data storage needs in a particular situation, unlocking the capacity of the single additional drive can be problematic in the mapped-RAID environment, especially if the remaining drives of a data storage system do not have enough free storage space to combine with that of the single additional drive.

Techniques are disclosed herein for managing restriping of data across a plurality of drives of a data storage system in a mapped-RAID environment. In response to addition of at least one new drive to the existing drives of the data storage system, the disclosed techniques can, in a background process, map out all drive extents of the data storage system in an effort to consume as much free storage space as possible across the respective drives. Having mapped out the drive extents of the data storage system, the disclosed techniques can determine, in the background process, how many free extents remain on each drive. If a quantity of free extents on a respective drive exceeds a predetermined threshold number, then that drive can be logically marked as requiring restriping. The disclosed techniques can then perform restriping of data for all such logically-marked drives. Once the restriping of the data is completed, the disclosed techniques can determine, in one or more subsequent background processes, whether any further restriping of data across the drives of the data storage system is required, taking into account a relative wear and/or utilization of the respective drives.

In certain embodiments, a method of managing restriping of data across drives of a data storage system in a mapped-RAID environment includes providing a data storage system, including a set of existing drives in the mapped-RAID environment. The method further includes, in response to addition of at least one new drive to the set of existing drives in the data storage system, mapping out all drive extents of the data storage system to consume free storage space across the set of existing drives and the at least one new drive. The method still further includes, having mapped out all drive extents of the data storage system, determining a quantity of remaining free extents on each of the set of existing drives and the at least one new drive, and, in the event the quantity of free extents remaining on a respective drive among the existing and new drives exceeds a predetermined threshold number, restriping data across at least the respective drive to reduce the quantity of free extents on the respective drive.

The respective drive having the quantity of free extents exceeding the predetermined threshold number can have an area of orphaned storage, and the method can further include restriping the data across at least the respective drive to reduce the area of orphaned storage.

The method can still further include remapping a respective drive extent from a first stripe that does not extend across the respective drive having the quantity of free extents exceeding the predetermined threshold number, to a second stripe that extends across the respective drive having the quantity of free extents exceeding the predetermined threshold number.

The method can yet further include logically marking the respective drive having the quantity of free extents exceeding the predetermined threshold number, and, having restriped the data across at least the respective drive, logically unmarking the respective drive having the quantity of free extents exceeding the predetermined threshold number.

The method can further include restriping the data across a least utilized drive, and restriping the data across a next least utilized drive, as well as restriping the least utilized drive and the next least utilized drive taking into account a relative wear and/or utilization of the respective least utilized and next least utilized drives to maintain uniform wear and/or utilization across the respective least utilized and next least utilized drives.

In certain further embodiments, a system for managing restriping of data across drives of a data storage system in a mapped-RAID environment includes storage processing circuitry, a memory including at least mapping management code, and a set of existing drives configured as a mapped redundant array of independent disks. The storage processing circuitry is configured to execute the mapping management code out of the memory in conjunction with the mapped redundant array of independent disks, in response to addition of at least one new drive to the set of existing drives, to map out all drive extents of the data storage system to consume free storage space across the set of existing drives and the at least one new drive. The storage processing circuitry is further configured to execute the mapping management code out of the memory in conjunction with the mapped redundant array of independent disks, having mapped out all drive extents of the data storage system, to determine a quantity of remaining free extents on each of the set of existing drives and the at least one new drive, and, in the event the quantity of free extents remaining on a respective drive among the existing and new drives exceeds a predetermined threshold number, to restripe data across at least the respective drive to reduce the quantity of free extents on the respective drive.

Other features, functions, and aspects of the invention will be evident from the Detailed Description that follows.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views.

DETAILED DESCRIPTION

Techniques are disclosed herein for managing restriping of data across a plurality of drives of a data storage system in a mapped-RAID environment. In response to addition of at least one new drive to the existing drives of the data storage system, the disclosed techniques can, in a background process, map out all drive extents of the data storage system in an effort to consume as much free storage space as possible across the drives. Having mapped out the drive extents of the data storage system, the disclosed techniques can determine, in the background process, how many free extents remain on each drive. If a quantity of free extents on a respective drive exceeds a predetermined threshold number, then that drive can be logically marked as requiring restriping. The disclosed techniques can then perform restriping of data for all such logically-marked drives. Once the restriping of the data is completed, the disclosed techniques can determine, in one or more subsequent background processes, whether any further restriping of data across the drives of the data storage system is required, taking into account a relative wear and/or utilization of the respective drives.

Figure 1:
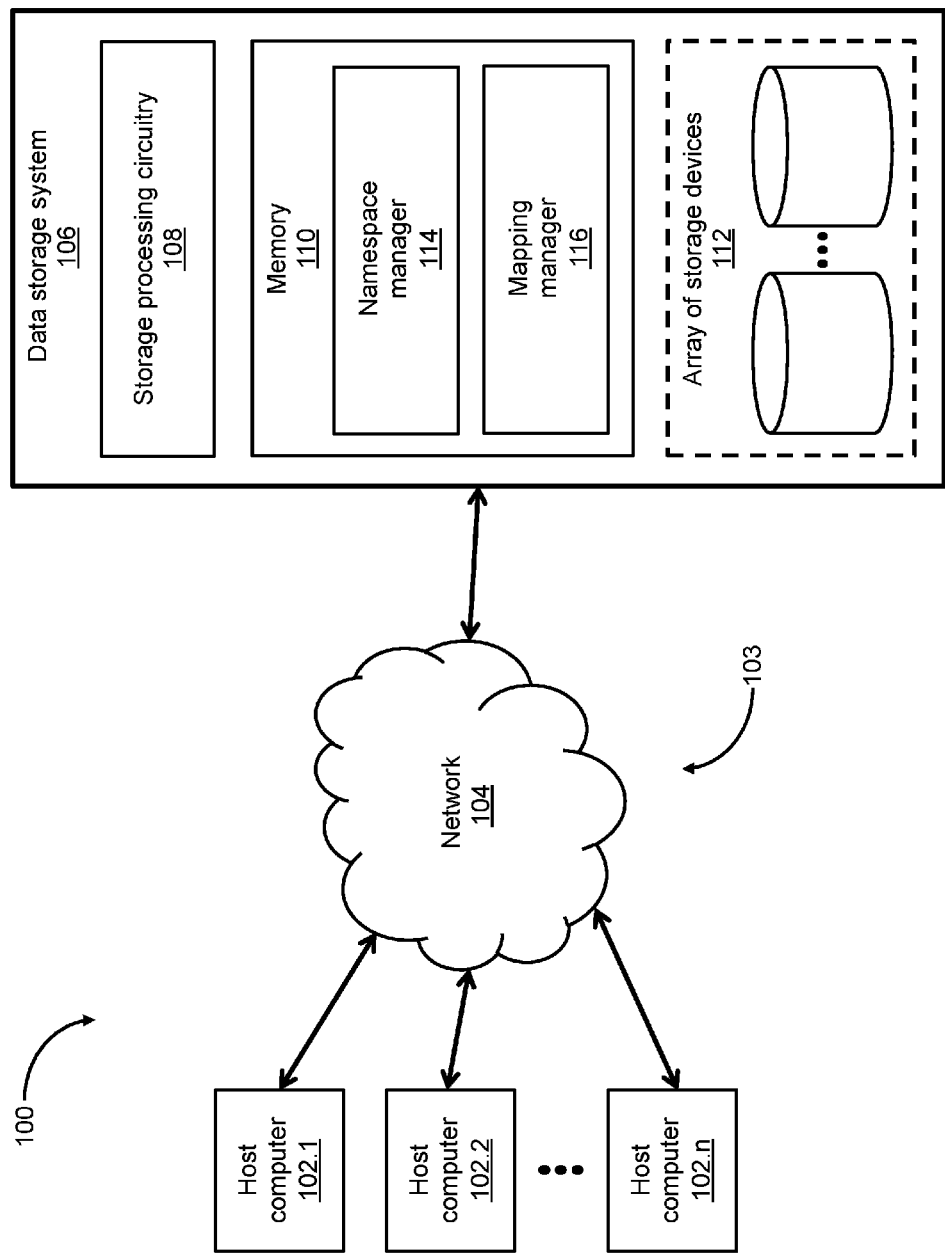
FIG. 1 is a block diagram of an exemplary environment, in which an exemplary data storage system configured to manage restriping of data across a plurality of drives in a mapped-RAID environment can be employed.

FIG. 1 depicts an illustrative embodiment of an exemplary data storage environment 100, in which an exemplary data storage system 106 configured to manage restriping of data across a plurality of drives in a mapped-RAID environment can be employed. As shown in FIG. 1, the data storage environment 100 includes a plurality of host computers 102.1, 102.2, . . . , 102.n communicably coupled to the data storage system 106 by a communications medium 103 that includes a network 104. For example, each of the plurality of host computers 102.1, 102.2, . . . , 102.n can be configured as a web server computer, a file server computer, an email server computer, an enterprise server computer, and/or any other suitable computer or computerized device for providing input/output (I/O) requests (e.g., small computer system interface (SCSI) commands) to the data storage system 106 over the communications medium 103. Such I/O requests provided by the plurality of host computers 102.1, 102.2, . . . , 102.n can direct the data storage system 106 to store and/or retrieve blocks of data from virtual volumes on behalf of the respective host computers 102.1, 102.2, . . . , 102.n.

The communications medium 103 can be configured to interconnect the plurality of host computers 102.1, 102.2, . . . , 102.n and the data storage system 106 to enable them to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper based data communications devices and cabling, fiber optic devices and cabling, wireless devices, or any suitable combination thereof. In addition, the communications medium 103 can be configured to support storage area network (SAN) based communications, local area network (LAN) based communications, cellular communications, wide area network (WAN) based communications, distributed infrastructure communications, and/or any other suitable communications.

As further shown in FIG. 1, the data storage system 106 can include storage processing circuitry 108, a memory 110, and an array of storage devices 112. The memory 110 can include persistent memory storage (e.g., flash memory, magnetic memory) and non-persistent cache memory storage (e.g., dynamic random access memory (DRAM), static random access memory (SRAM)), and accommodate a variety of software constructs including, but not limited to, operating system code and data, data storage system code and data, namespace management code and data, mapping management code and data, and drive restriping management code and data. The memory 110 can further include a namespace manager 114 and a mapping manager 116. The namespace manager 114 is configured to maintain a namespace of objects (e.g., storage volumes such as logical storage units (LUNs) and/or virtual machine volumes (VVOLs)) accessible to the plurality of host computers 102.1, 102.2, . . . , 102.n. For example, each storage volume can be made up of one or more extents, each of which can correspond to a range of storage sizes (e.g., 1 megabyte (Mb), 4 megabytes (Mbs)) within a large stripe of data (e.g., 1 gigabyte (Gb)) in the mapped-RAID environment. Such a mapped-RAID environment is described in co-pending International Patent Application No. PCT/RU2017/000273 filed Apr. 27, 2017 entitled RE-PLACING DATA WITHIN A MAPPED-RAID ENVIRONMENT, the disclosure of which is incorporated herein by reference in its entirety. The range of storage sizes corresponding to the respective extents can be a range of contiguous logical addresses spanning some or all of a LUN or VVOL. The mapping manager 116 is configured to map logical address extents maintained by the namespace manager 114 to corresponding redundant array of independent disk (RAID) addresses, which, in turn, are mapped to corresponding drive locations in the array of storage devices 112. The storage processing circuitry 108 can include one or more physical storage processors or engines, data movers, director boards, blades, I/O modules, storage drive controllers, switches, and/or any other suitable computer hardware or combination thereof. For example, the storage processing circuitry 108 can process the I/O requests from the plurality of host computers 102.1, 102.2, ..., 102.n, and store host data in the mapped-RAID environment implemented by the array of storage devices 112.

Figure 2A:
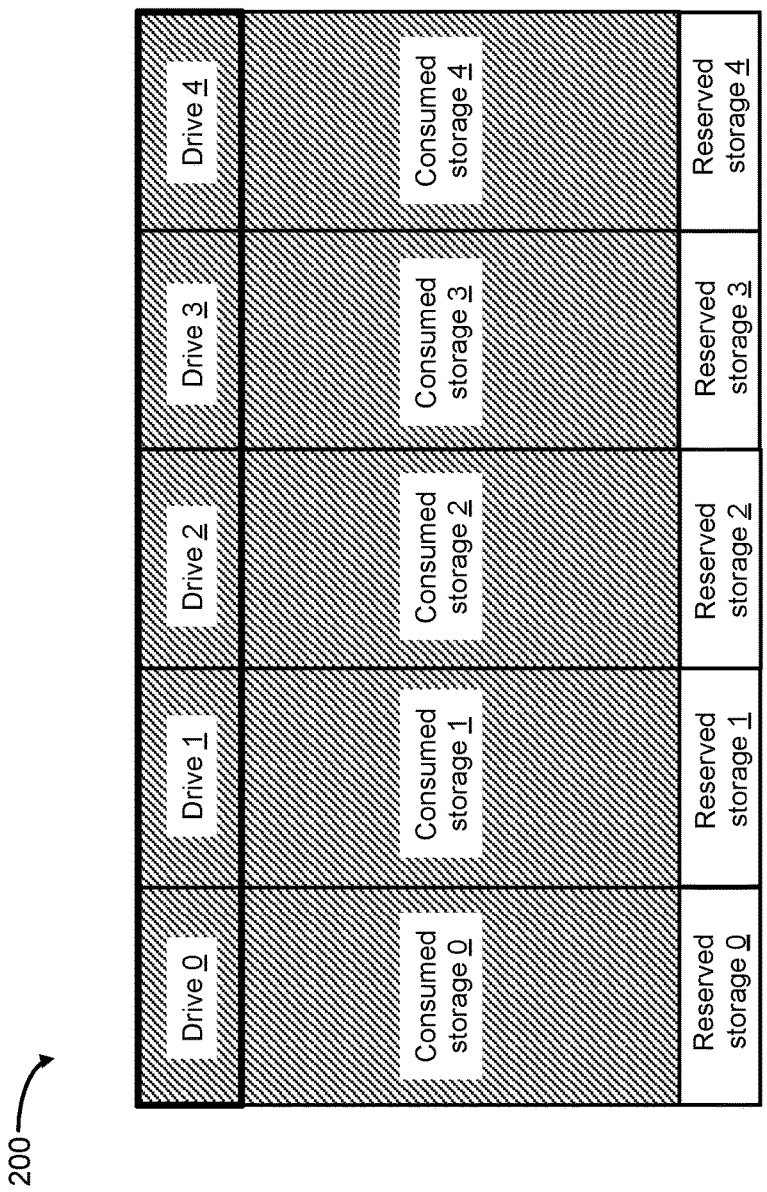
FIG. 2a is an illustration of a plurality of drives of the data storage system in the mapped-RAID environment of FIG. 1, in which essentially all available (or "free") data storage capacity of the respective drives has been consumed.

As described herein, the mapping manager 116 can map logical address extents to corresponding RAID addresses, which, in turn, are mapped to corresponding drive locations in the array of storage devices 112. FIG. 2a depicts a representation 200 of a set of exemplary drives 0, 1, 2, 3, 4 included in the array of storage devices 112, in which essentially all available (or "free") data storage capacity of the respective drives 0, 1, 2, 3, 4 has been consumed. As shown in FIG. 2a, the drive 0 has a consumed storage area 0 and a reserved storage area 0. Similarly, the drive 1 has a consumed storage area 1 and a reserved storage area 1, the drive 2 has a consumed storage area 2 and a reserved storage area 2, the drive 3 has a consumed storage area 3 and a reserved storage area 3, and the drive 4 has a consumed storage area 4 and a reserved storage area 4. It is noted that the reserved storage areas 0, 1, 2, 3, 4 can be provided in the drives 0, 1, 2, 3, 4, respectively, of the data storage system 106 to account for drive failure scenarios that may require an amount of free storage space to achieve desired operational recovery.

Figure 2B:
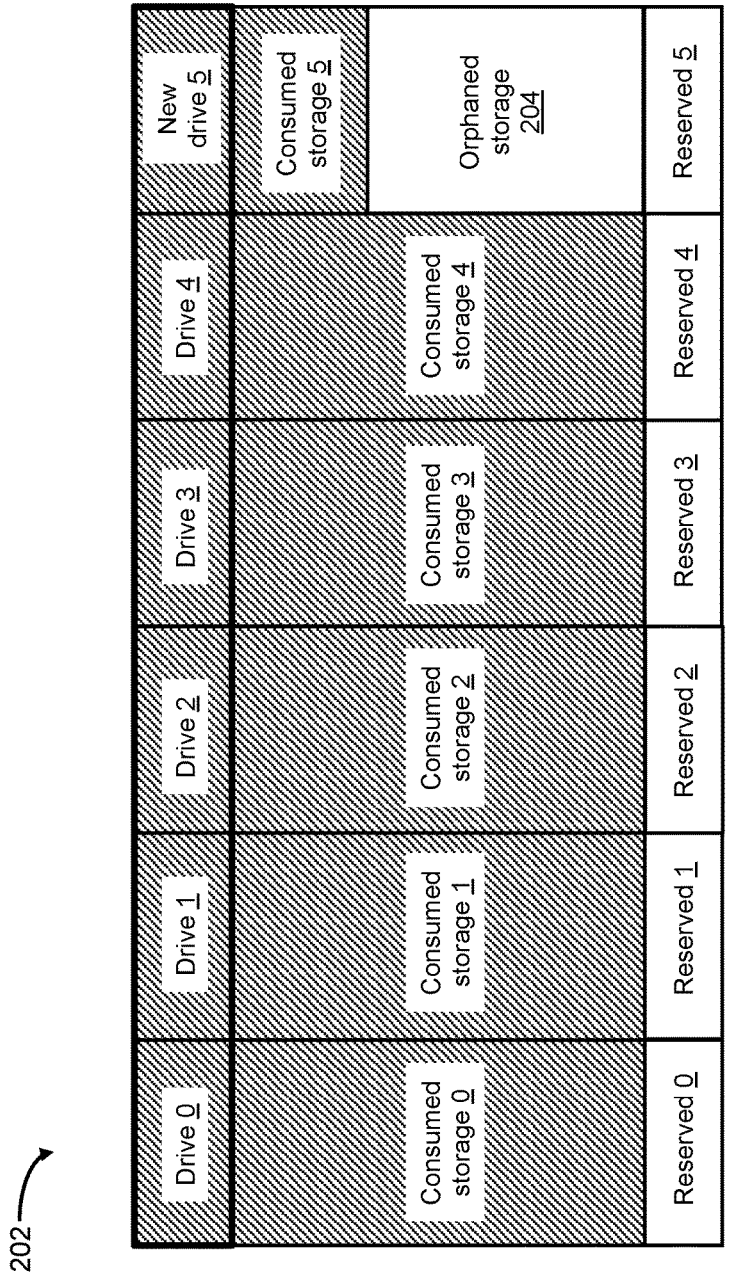
FIG. 2b is an illustration of the plurality of drives of the data storage system of FIG. 2a, as well as a new drive added to the data storage system and having an amount of orphaned storage (i.e., storage space not combinable with free space on any other drive)

In order to provide additional storage capacity to the array of storage devices 112 within the data storage system 106, one or more new drives can be added to the set of existing drives 0, 1, 2, 3, 4. FIG. 2b depicts the set of existing drives 0, 1, 2, 3, 4 with their respective consumed and reserved storage areas 0, 1, 2, 3, 4, as well as a newly added drive 5. As shown in FIG. 2b, the new drive 5 has a consumed storage area 5 and a reserved storage area 5. Once the new drive 5 is added to the set of existing drives 0, 1, 2, 3, 4 within the array of storage devices 112, the mapping manager 116 may successfully map at most a limited quantity of logical address extents to corresponding RAID addresses of drive locations on the new drive 5. Further, because the set of existing drives 0, 1, 2, 3, 4 may not have enough free storage space to combine with free storage space on the new drive 5, the new drive 5 may also have an orphaned storage area 204, which includes the free storage space on the new drive 5 that is not combinable with the free storage space on any of the existing drives 0, 1, 2, 3, 4. It is noted that such an orphaned storage area on a newly added drive within the data storage system 106 of FIG. 1 may increase over time, potentially causing an operational failure or abnormal termination of the data storage system 106.

During operation of the data storage system 106, the need to restripe data across the set of drives 0, 1, 2, 3, 4, including any newly added drive(s) in the mapped-RAID environment, can be detected and acted upon to reduce an amount of orphaned storage on the new drive(s), as well as maintain a more uniform wear and/or utilization of the respective drives. In response to the addition of a new drive (e.g., the new drive 5) in the data storage system 106, all drive extents of the data storage system 106 can be mapped out, in a background process, in an effort to consume as much free storage space as possible across the respective drives. Once the drive extents of the data storage system 106 have been mapped out, a quantity of free extents remaining on each drive can be determined in the background process. If a quantity of free extents on a respective drive exceeds a predetermined threshold number (e.g., 50, 75, or any other suitable number), then the respective drive can be logically marked as requiring restriping. Such restriping of data can then be performed for all such logically-marked drives. Once the restriping of the data is completed, possible further need to restripe data across one or more of the respective drives of the data storage system 106 is detected and acted upon in the background process, taking into account a relative wear and/or utilization of the respective drives. It is noted that the data storage system 106 can at least partially service I/O requests from the plurality of host computers 102.1, 102.2, ..., 102.n, without waiting for the background process to complete.

Figure 3A:
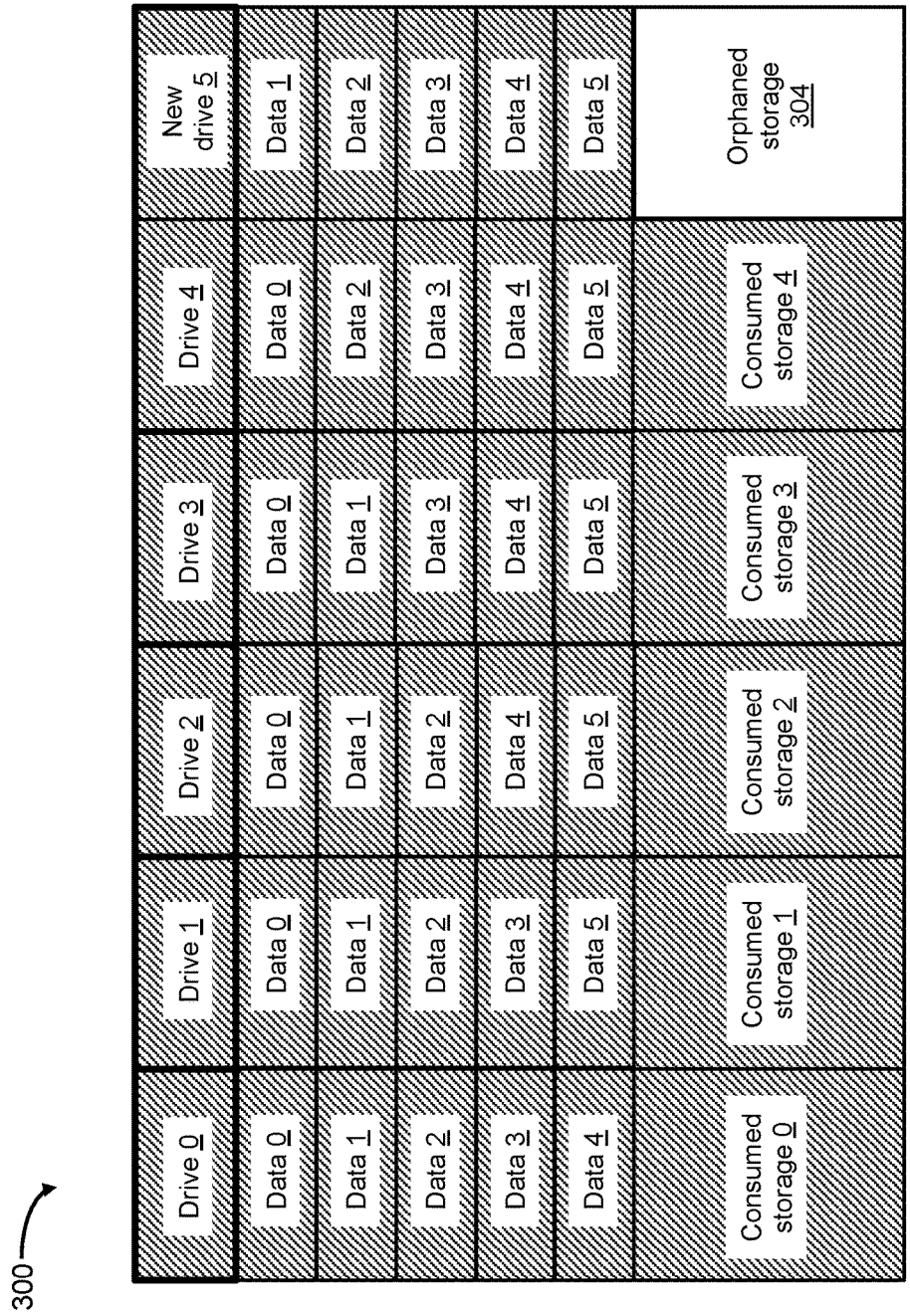
FIG. 3a is a further illustration of a plurality of drives of the data storage system in the mapped-RAID environment of FIG. 1, showing a plurality of existing drives, a newly added drive having an amount of orphaned storage, and a plurality of extents striped across subsets of the existing and/or newly added drives.
Figure 3B:
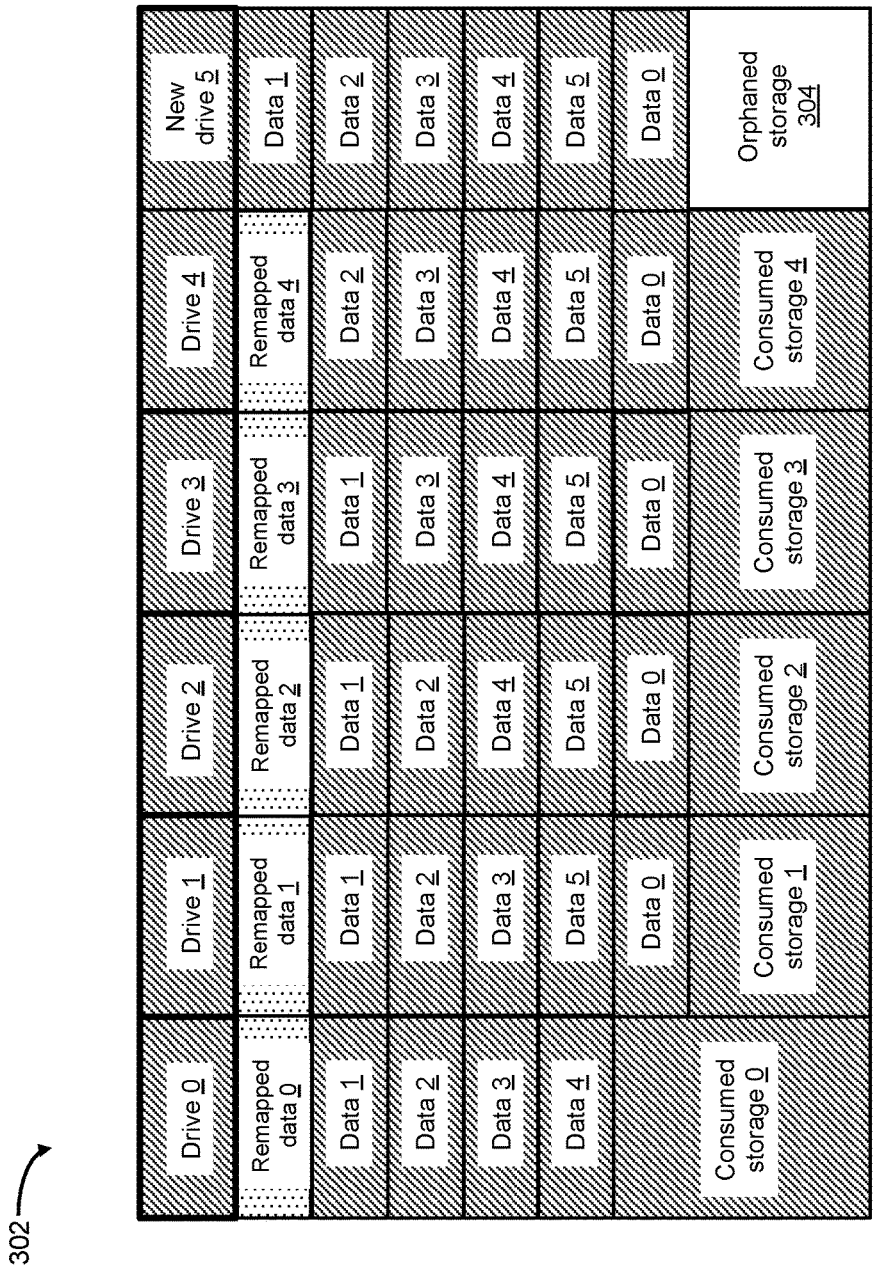
FIG. 3b is an illustration of the plurality of existing drives and newly added drive of FIG. 3a, in which at least the newly added drive has been restriped to reduce the amount of orphaned storage on the newly added drive.

The operation of the data storage system 106 for managing restriping of data across a plurality of drives in a mapped-RAID environment will be further understood with reference to the following illustrative example, as well as FIGS. 1, 3a, and 3b. As described herein, such managing of the restriping of data across the plurality of drives in the mapped-RAID environment can be performed by the data storage system 106 in a background process. In this example, the array of storage devices 112 within the data storage system 106 (see FIG. 1) includes the set of drives 0, 1, 2, 3, 4, a representation 300 (see FIG. 3a) of which is illustrated in FIG. 3a. As described herein with reference to FIG. 2a, the drive 0 can have a consumed storage area 0, the drive 1 can have a consumed storage area 1, the drive 2 can have a consumed storage area 2, the drive 3 can have a consumed storage area 3, and the drive 4 can have a consumed storage area 4. To provide additional storage capacity to the array of storage devices 112 within the data storage system 106, the new drive 5 is added to the set of drives 0, 1, 2, 3, 4 illustrated in FIG. 3a. As further described herein with reference to FIG. 2a, the new drive 5 can have an orphaned storage area 304, which includes free storage space on the new drive 5 that is not combinable with free storage space on any of the existing drives 0, 1, 2, 3, 4 of the data storage system 106.

In this example, in response to the addition of the new drive 5 in the data storage system 106, the storage processing circuitry 108, in conjunction with the array of storage devices 112, determines whether or not restriping of data is required across the set of existing drives 0, 1, 2, 3, 4 and the new drive 5. For example, such restriping of data may be required to reduce an amount of orphaned storage within the orphaned storage area 304 of the new drive 5, and/or to maintain a more uniform wear and/or utilization of the respective drives 0, 1, 2, 3, 4, 5. To determine whether restriping of data is required across the respective drives 0, 1, 2, 3, 4, 5, all drive extents of the data storage system 106 are mapped out in an effort to consume as much free space as possible across the respective drives 0, 1, 2, 3, 4, 5. FIG. 3a depicts a plurality of such drive extents that can be mapped out, including, but not limited to, a $0^{th}$ drive extent labeled "Data 0" striped across drives 0, 1, 2, 3, 4, a $1^{st}$ drive extent labeled "Data 1" striped across drives 0, 1, 2, 3, 5, a $2^{nd}$ drive extent labeled "Data 2" striped across drives 0, 1, 2, 4, 5, a $3^{rd}$ drive extent labeled "Data 3" striped across drives 0, 1, 3, 4, 5, a $4^{th}$ drive extent labeled "Data 4" striped across drives 0, 2, 3, 4, 5, and a $5^{th}$ drive extent labeled "Data 5" striped across drives 1, 2, 3, 4, 5. It is noted that each drive extent labeled "Data 0", "Data 1", "Data 2", "Data 3", "Data 4", or "Data 5" can correspond to a range of storage sizes (e.g., 1 Mb, 4 Mbs) within a large stripe of data (e.g., 1 Gb) in the mapped-RAID environment.

Having mapped out the drive extents labeled "Data 0", "Data 1", "Data 2", "Data 3", "Data 4", and "Data 5", the storage processing circuitry 108, in conjunction with the array of storage devices 112, determines how many free extents remain on each of the respective drives 0, 1, 2, 3, 4, 5. If the remaining quantity of free extents on one or more of the respective drives 0, 1, 2, 3, 4, 5 exceeds the predetermined threshold number (e.g., 50, 75, or any other suitable number), then the respective drives 0, 1, 2, 3, 4, and/or 5 are logically marked as requiring restriping. In this example, the new drive 5 can correspond to such a drive having a remaining quantity of free extents that exceeds the predetermined threshold number, due at least in part to the amount of storage in its orphaned storage area 304. The new drive 5 can therefore be logically marked as requiring restriping.

The storage processing circuitry 108, in conjunction with the mapping manager 116, restripes of the logically-marked new drive 5. In this example, a determination is made as to whether or not each of the drive extents labeled "Data 0", "Data 1", "Data 2", "Data 3", "Data 4", or "Data 5" is striped across the new drive 5 (and/or any other logically-marked drive(s)). It is noted that such a determination can be made for each drive extent within each large stripe of data handled by the data storage system 106 in the mapped-RAID environment 100. As shown in FIG. 3a, only the drive extent labeled "Data 0" is not striped across the new drive 5. Unlike the drive extent labeled "Data 0", portions of each of the drive extents labeled "Data 1", "Data 2", "Data 3", "Data 4", and "Data 5" are striped across the new drive 5. Because the drive extent labeled "Data 0" is not striped across the new drive 5, and is therefore not utilizing any available storage space on the new drive 5, the drive extent labeled "Data 0" (as well as other drive extents within the same large stripe of data) is freed from storage in its corresponding large stripe of data, and the large stripe of data storing the drive extent labeled "Data 0" is moved, remapped, reallocated, and/or otherwise reformed such that at least a portion of the drive extent labeled "Data 0" is restriped across the new drive 5, using one or more of the free extents on the new drive 5.

FIG. 3b depicts the drive extent labeled "Data 0" (stored in its large stripe of data) restriped across the drives 1, 2, 3, 4, 5. As shown in FIG. 3b, free extents on the drives 0, 1, 2, 3, 4 that originally stored portions of the drive extent labeled "Data 0" can now accommodate other remapped data 0, 1, 2, 3, 4, respectively, as desired and/or required to satisfy a user's data storage needs. Having restriped the logically-marked new drive 5, each of the drive extents labeled "Data 0", "Data 1", "Data 2", "Data 3", "Data 4", and "Data 5" is at least partially striped across the new drive 5, and is therefore utilizing at least some of the available storage space on the new drive 5. In this way, the amount of available storage in the orphaned storage area 304 of the new drive 5 can be reduced. Once the restriping of the logically-marked new drive 5 is completed, the new drive 5 can be logically unmarked. In addition, further determinations can be made, in one or more subsequent background processes, as to whether any further restriping of data across the respective drives 0, 1, 2, 3, 4, 5 of the data storage system 106 is required, taking into account a relative wear and/or utilization of the respective drives 0, 1, 2, 3, 4, 5. For example, if the drives are implemented as solid state drives (SSDs), then the least utilized solid state drive (SSD) drive can be selected for restriping, followed by the next least utilized SSD, and so on, taking into account the relative wear and/or utilization of the selected SSDs so that uniform wear and/or utilization are maintained across the respective SSDs.

Figure 4:
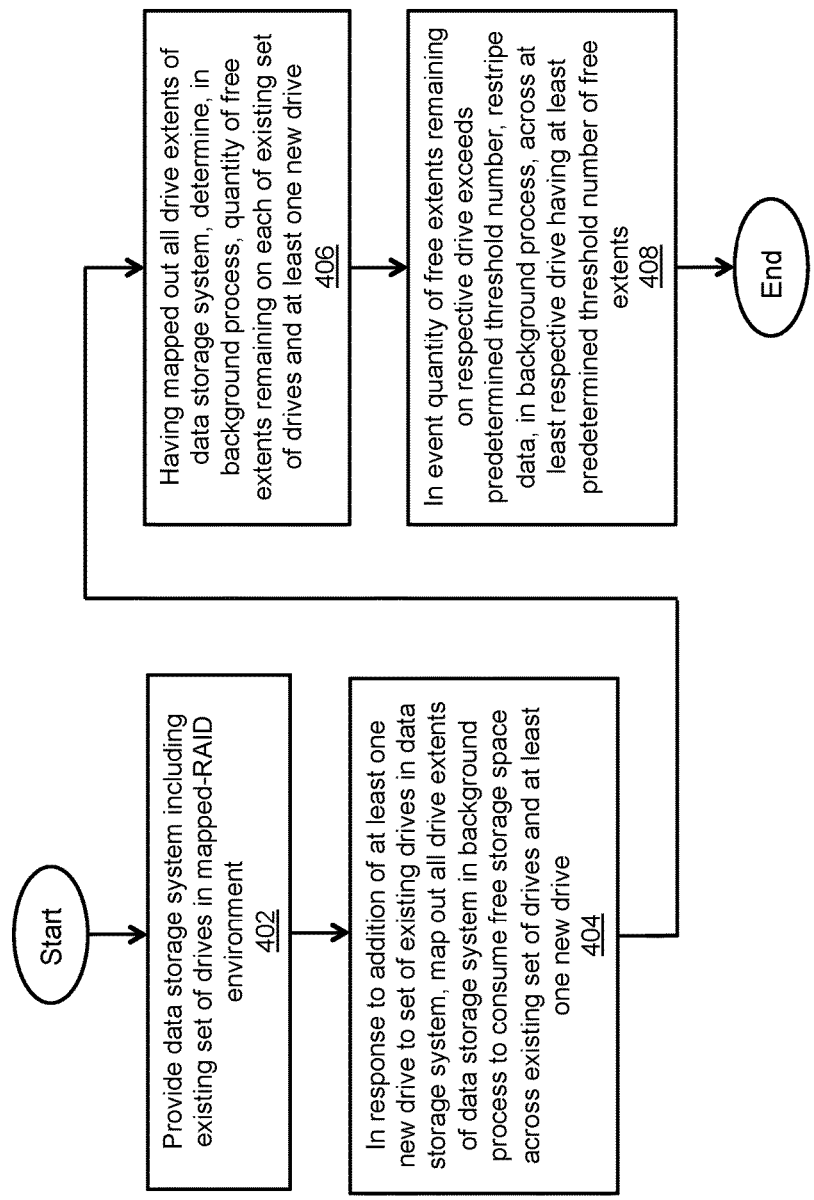
FIG. 4 is a flow diagram of an exemplary method of managing restriping of data across a plurality of drives of a data storage system in a mapped-RAID environment.

An exemplary method of managing restriping of data across a plurality of drives of a data storage system in a mapped-RAID environment is described below with reference to FIGS. 1 and 4. As depicted in block 402 (see FIG. 4), the data storage system 106 is provided, including an existing set of drives in the mapped-RAID environment 100 (see FIG. 1). As depicted in block 404, in response to addition of at least one new drive to the set of existing drives in the data storage system 106, all drive extents of the data storage system 106 are mapped out in a background process to consume free storage space across the existing set of drives and the at least one new drive. As depicted in block 406, having mapped out all drive extents of the data storage system 106, a quantity of free extents remaining on each of the existing set of drives and the at least one new drive is determined in the background process. As depicted in block 408, in the event the quantity of free extents remaining on a respective drive exceeds a predetermined threshold number, data is restriped across at least the respective drive having at least the predetermined threshold number of free extents in the background process.

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of managing restriping of data across drives of a data storage system in a mapped redundant array of independent disk (RAID) environment, comprising:
   providing a data storage system including a set of existing drives in the mapped-RAID environment;
   in response to addition of at least one new drive to the set of existing drives in the data storage system, mapping out all drive extents of the data storage system to consume free storage space across the set of existing drives and the at least one new drive;
   having mapped out all drive extents of the data storage system, determining a quantity of remaining free extents on each of the set of existing drives and the at least one new drive; and
   in the event the quantity of free extents remaining on a respective drive among the existing and new drives exceeds a predetermined threshold number, restriping data across at least the respective drive to reduce the quantity of free extents on the respective drive.

2. The method of claim 1 wherein the respective drive having the quantity of free extents exceeding the predetermined threshold number has an area of orphaned storage, and wherein the restriping of the data includes restriping the data across at least the respective drive to reduce the area of orphaned storage.

3. The method of claim 1 wherein the restriping of the data includes remapping a respective drive extent from a first stripe that does not extend across the respective drive having the quantity of free extents exceeding the predetermined threshold number, to a second stripe that extends across the respective drive having the quantity of free extents exceeding the predetermined threshold number.

4. The method of claim 1 further comprising:
logically marking the respective drive having the quantity of free extents exceeding the predetermined threshold number.

5. The method of claim 4 further comprising:
having restriped the data across at least the respective drive, logically unmarking the respective drive having the quantity of free extents exceeding the predetermined threshold number.

6. The method of claim 1 wherein the restriping of the data across at least the respective drive having the quantity of free extents exceeding the predetermined threshold number includes restriping the data across a least utilized drive.

7. The method of claim 6 wherein the restriping of the data across at least the respective drive having the quantity of free extents exceeding the predetermined threshold number further includes restriping the data across a next least utilized drive.

8. The method of claim 7 wherein the restriping of the data across at least the respective drive having the quantity of free extents exceeding the predetermined threshold number further includes restriping the least utilized drive and the next least utilized drive taking into account a relative wear and/or utilization of the respective least utilized and next least utilized drives to maintain uniform wear and/or utilization across the respective least utilized and next least utilized drives.

9. A system for managing restriping of data across drives of a data storage system in a mapped redundant array of independent disk (RAID) environment, comprising:
storage processing circuitry;
a memory including mapping management code; and
a set of existing drives configured as a mapped redundant array of independent disks,
wherein the storage processing circuitry is configured to execute the mapping management code out of the memory in conjunction with the mapped redundant array of independent disks:
in response to addition of at least one new drive to the set of existing drives, to map out all drive extents of the data storage system to consume free storage space across the set of existing drives and the at least one new drive;
having mapped out all drive extents of the data storage system, to determine a quantity of remaining free extents on each of the set of existing drives and the at least one new drive; and
in the event the quantity of free extents remaining on a respective drive among the existing and new drives exceeds a predetermined threshold number, to restripe data across at least the respective drive to reduce the quantity of free extents on the respective drive.

10. The system of claim 9 wherein the respective drive having the quantity of free extents exceeding the predetermined threshold number has an area of orphaned storage, and wherein the storage processing circuitry is further configured to execute the mapping management code out of the memory in conjunction with the mapped redundant array of independent disks to restripe the data across at least the respective drive to reduce the area of orphaned storage.

11. The system of claim 9 wherein the storage processing circuitry is further configured to execute the mapping management code out of the memory in conjunction with the mapped redundant array of independent disks to remap a respective drive extent from a first stripe that does not extend across the respective drive having the quantity of free extents exceeding the predetermined threshold number, to a second stripe that extends across the respective drive having the quantity of free extents exceeding the predetermined threshold number.

12. The system of claim 9 wherein the storage processing circuitry is further configured to execute the mapping management code out of the memory in conjunction with the mapped redundant array of independent disks to logically mark the respective drive having the quantity of free extents exceeding the predetermined threshold number.

13. The system of claim 12 wherein the storage processing circuitry is further configured to execute the mapping management code out of the memory in conjunction with the mapped redundant array of independent disks, having restriped the data across at least the respective drive, to logically unmark the respective drive having the quantity of free extents exceeding the predetermined threshold number.

14. The system of claim 9 wherein the storage processing circuitry is further configured to execute the mapping management code out of the memory in conjunction with the mapped redundant array of independent disks to restripe the data across a least utilized drive.

15. The system of claim 14 wherein the storage processing circuitry is further configured to execute the mapping management code out of the memory in conjunction with the mapped redundant array of independent disks to restripe the data across a next least utilized drive.

16. The system of claim 15 wherein the storage processing circuitry is further configured to execute the mapping management code out of the memory in conjunction with the mapped redundant array of independent disks to restripe the least utilized drive and the next least utilized drive taking into account a relative wear and/or utilization of the respective least utilized and next least utilized drives to maintain uniform wear and/or utilization across the respective least utilized and next least utilized drives.

17. The system of claim 16 wherein each of the least utilized drive and the next least utilized drive is a solid state drive (SSD).

18. The system of claim 9 wherein the memory further includes namespace management code, and wherein the storage processing circuitry is further configured to execute the namespace management code out of the memory to maintain a namespace of objects accessible to one or more host computers.

19. The system of claim 18 wherein each object is one of a logical storage unit (LUN) and a virtual machine volume (VVOL).

20. A computer program product having a non-transitory computer readable medium that stores a set of instructions to manage restriping of data across drives of a data storage system in a mapped redundant array of independent disk (RAID) environment, the data storage system including a set of existing drives, the set of instructions, when carried out by computerized circuitry, causing the computerized circuitry to perform a method of:

in response to addition of at least one new drive to the set of existing drives in the data storage system, mapping out all drive extents of the data storage system to consume free storage space across the set of existing drives and the at least one new drive;

having mapped out all drive extents of the data storage system, determining a quantity of remaining free extents on each of the set of existing drives and the at least one new drive; and in the event the quantity of free extents remaining on a respective drive among the existing and new drives exceeds a predetermined threshold number, restriping data across at least the respective drive to reduce the quantity of free extents on the respective drive.

* * * * *